United States Patent
Lee (10) Patent No.: US 7,570,314 B2
(45) Date of Patent: Aug. 4, 2009

(54) DISPLAY DEVICE INCLUDING A BOTTOM CHASSIS HAVING COUPLING AREAS AND SUPPORT AREAS

(75) Inventor: Kyoung-Don Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 248 days.

(21) Appl. No.: 11/248,959

(22) Filed: Oct. 12, 2005

(65) Prior Publication Data

US 2006/0087601 A1  Apr. 27, 2006

(30) Foreign Application Priority Data

Oct. 12, 2004  (KR) .................... 10-2004-0081337

(51) Int. Cl.
G02F 1/1333 (2006.01)
G02F 1/1335 (2006.01)
G02F 1/1345 (2006.01)
H05K 5/00 (2006.01)

(52) U.S. Cl. .................... 349/58; 349/83; 349/149; 349/65; 248/917; 361/679; 361/681; 361/682; 361/683

(58) Field of Classification Search .................... 349/58, 349/83, 149, 65; 248/917; 361/679, 681–683; 345/904, 905; 362/632–634, 368–371, 390
See application file for complete search history.

(56) References Cited

U.S. PATENT DOCUMENTS

| | | | | |
|---|---|---|---|---|
| 5,432,626 A | * | 7/1995 | Sasuga et al. .................. | 349/58 |
| 6,046,785 A | * | 4/2000 | Won .............................. | 349/58 |
| 6,166,788 A | * | 12/2000 | Ha et al. ........................ | 349/58 |
| 6,292,239 B1 | * | 9/2001 | Nagamura et al. ............ | 349/58 |
| 6,297,945 B1 | * | 10/2001 | Yamamoto ................... | 361/681 |
| 6,587,166 B1 | | 7/2003 | Lee et al. | |
| 6,593,979 B1 | * | 7/2003 | Ha et al. ........................ | 349/58 |
| 6,667,780 B2 | * | 12/2003 | Cho .............................. | 349/58 |
| RE38,516 E | * | 5/2004 | Hasegawa et al. ............. | 349/58 |
| 6,847,416 B2 | * | 1/2005 | Lee et al. ....................... | 349/58 |
| 6,847,417 B2 | * | 1/2005 | Kim .............................. | 349/58 |
| 6,931,265 B2 | * | 8/2005 | Reyes et al. .................. | 455/566 |
| 6,976,781 B2 | * | 12/2005 | Chu et al. .................... | 362/633 |
| 7,004,614 B2 | * | 2/2006 | Tsai et al. .................... | 362/633 |
| 7,050,128 B2 | * | 5/2006 | Lee et al. ....................... | 349/58 |
| 7,161,643 B2 | * | 1/2007 | Hayano ........................ | 349/58 |
| 7,197,227 B2 | * | 3/2007 | Fan et al. ..................... | 385/147 |
| 7,223,003 B2 | * | 5/2007 | Kim ............................. | 362/561 |

(Continued)

FOREIGN PATENT DOCUMENTS

CN           1309317 A       8/2001

(Continued)

*Primary Examiner*—Ha Tran T Nguyen
*Assistant Examiner*—Karen M Kusumakar
(74) *Attorney, Agent, or Firm*—Cantor Colburn LLP (57) ABSTRACT

There is provided a display device including a panel unit displaying an image, and a fixing member receiving the panel unit and including a bottom portion and a side portion extending from a boundary of the bottom portion toward the panel unit. The side portion of the fixing member includes at least two coupling areas and a support area extending from the coupling areas, wherein, a coupling opening is formed in the coupling areas, and the distance from one end of the coupling opening to the boundary of the bottom portion close to the other end of the coupling opening is smaller than the width of the support area.

12 Claims, 8 Drawing Sheets

U.S. PATENT DOCUMENTS

| | | | |
|---|---|---|---|
| 7,226,201 B1* | 6/2007 | Li et al. | 362/633 |
| 7,369,189 B2* | 5/2008 | Chieh | 349/58 |
| 2003/0043314 A1* | 3/2003 | Lee et al. | 349/65 |
| 2003/0058380 A1* | 3/2003 | Kim et al. | 349/58 |
| 2003/0122992 A1 | 7/2003 | Hayashimoto et al. | |
| 2003/0234895 A1* | 12/2003 | Sugawara et al. | 349/58 |
| 2003/0234896 A1 | 12/2003 | Kim | |

FOREIGN PATENT DOCUMENTS

| | | |
|---|---|---|
| CN | 1407380 A | 4/2003 |
| JP | 08-334775 | 12/1996 |
| JP | 2000227604 | 8/2000 |
| JP | 2004021257 | 1/2004 |
| KR | 19990035563 | 5/1999 |
| KR | 100304256 | 7/2001 |
| KR | 1020030056862 | 7/2003 |
| KR | 1020030088576 | 11/2003 |
| KR | 1020030097061 | 12/2003 |
| KR | 1020040002313 | 1/2004 |

* cited by examiner

DISPLAY DEVICE INCLUDING A BOTTOM CHASSIS HAVING COUPLING AREAS AND SUPPORT AREAS

CROSS-REFERENCE TO RELATED APPLICATIONS

The present application claims priority to Korean patent application No. 2004-0081337 filed in the Korean Intellectual Property Office on Oct. 12, 2004, the contents of which are herein incorporated by reference in their entirety.

BACKGROUND OF THE INVENTION (a) Field of the Invention

The present invention relates to a display device and more particularly to a display device having improved strength.

(b) Description of the Related Art

Thanks to the recent drastic development of semiconductor technologies, liquid crystal display (LCD) devices have been decreased in size and weight and enhanced in performance, and demand for such display devices has increased explosively.

LCD devices employing an LCD panel have advantages such as small size, small weight, and low power consumption, and have become attractive as a substitute for cathode ray tubes (CRT). Now, such LCD devices are used in small-sized products, such as cellular phones and portable digital assistants (PDAs), and middle-sized or large-sized products, such as monitors and televisions, which all require a display device.

LCD devices change a specific molecular alignment of liquid crystal to different molecular alignments through the application of a voltage and convert a change in optical characteristics, such as birefringence, optical rotary power, dichroism, and optical scattering, of liquid crystal cells emitting light due to the change in molecular alignment into a visual change. That is, LCD devices are light receiving display devices which display data using modulation of light in the liquid crystal cells.

Recently, an organic light emitting display (OLED) device has been in the spotlight as a next-generation display device. An OLED device uses a self light-emitting phenomenon to display an image, wherein light is emitted by combining electrons and holes injected from a cathode and an anode in an organic substance. Since the OLED device is an active element that emits light voluntarily, it has high emission efficiency and low power consumption. Further, because the OLED device can be driven even with a voltage of 15V or less, it is suitable for a small-sized display device and is low in manufacturing cost.

Therefore, LCD devices or OLED devices are used for most small-sized display devices, e.g., for cellular phones and so on. Since most cellular phones are manufactured in a folder type for the purpose of a user's convenience, dual display devices having display devices fitted to the front and back surfaces of a folder unit of a cellular phone are widely used in folder-type cellular phones.

As a small-sized display device may be dropped on the ground during utilization of a cellular phone, and so on, the display device should have enough strength to prevent damage. However, for the purpose of portability, it is difficult to further provide the cellular phone with an element for enhancing the strength of the cellular phone. Therefore, studies for preventing damage of the display device due to external impacts by changing elements of the display device have been made.

Specifically, in the display devices, since a panel unit displaying an image is made of a glass material, the panel unit is protected from external impacts by a chassis and a mold frame having higher strength than that of the glass material. Since the chassis is usually made of stainless steel, it has a large influence on the mechanical strength of the display devices. Therefore, various methods have been developed for minimizing the deformation of the chassis to improve the strength of the display devices.

SUMMARY OF THE INVENTION

The present invention is contrived to solve the above-mentioned problems and the present invention prevents damage of a display device due to external impacts by deforming a fixing member to improve the strength of the display device.

According to an aspect of the present invention, there is provided a display device including a panel unit displaying an image, and a fixing member receiving the panel unit and including a bottom portion and a side portion extending from a boundary of the bottom portion toward the combining direction of the panel unit. Here, the side portion of the fixing member includes at least two coupling areas and a support area extending from the coupling areas, wherein a coupling opening is formed in the coupling areas and the distance from one end of the coupling opening to the boundary of the bottom portion close to the other end of the coupling opening is smaller than the width of the support area.

The support area may be formed in the center in the length direction of the side portion.

The coupling areas may be formed in the length direction of the side portion.

The width of the coupling areas may be greater than the width of the support area.

The coupling opening may be disposed apart from the boundary of the bottom portion.

The length of the coupling opening may be smaller than or equal to the length of the coupling area.

The fixing member includes a first fixing member and the display device may further include a second fixing member surrounding the panel unit, and a coupling portion protruded from the side surface of the second fixing member may be inserted into and fixed to the coupling opening of the first fixing member.

The second fixing member may be made of resin.

An element-receiving opening is formed in the bottom portion of the fixing member.

The display device may further include a plurality of panel units and at least one of the panel units may be an LCD panel.

The display device may be used for a cellular phone.

The fixing member may be made of a metal.

BRIEF DESCRIPTION OF THE DRAWINGS

The patent or application file contains at least one drawing executed in color. Copies of this patent or patent application publication with color drawings will be provided by the Office upon receipt and payment of the necessary fee.

The above and other features and advantages of the present invention will become more apparent by describing in detail exemplary embodiments thereof with reference to the attached drawings, in which.

DETAILED DESCRIPTION OF THE EMBODIMENTS

Hereinafter, embodiments of the present invention will be described with reference to FIGS. 1 to 4. The embodiments of the present invention are intended only to exemplify the present invention, and thus the present invention is not limited to the embodiments.

Figure 1:
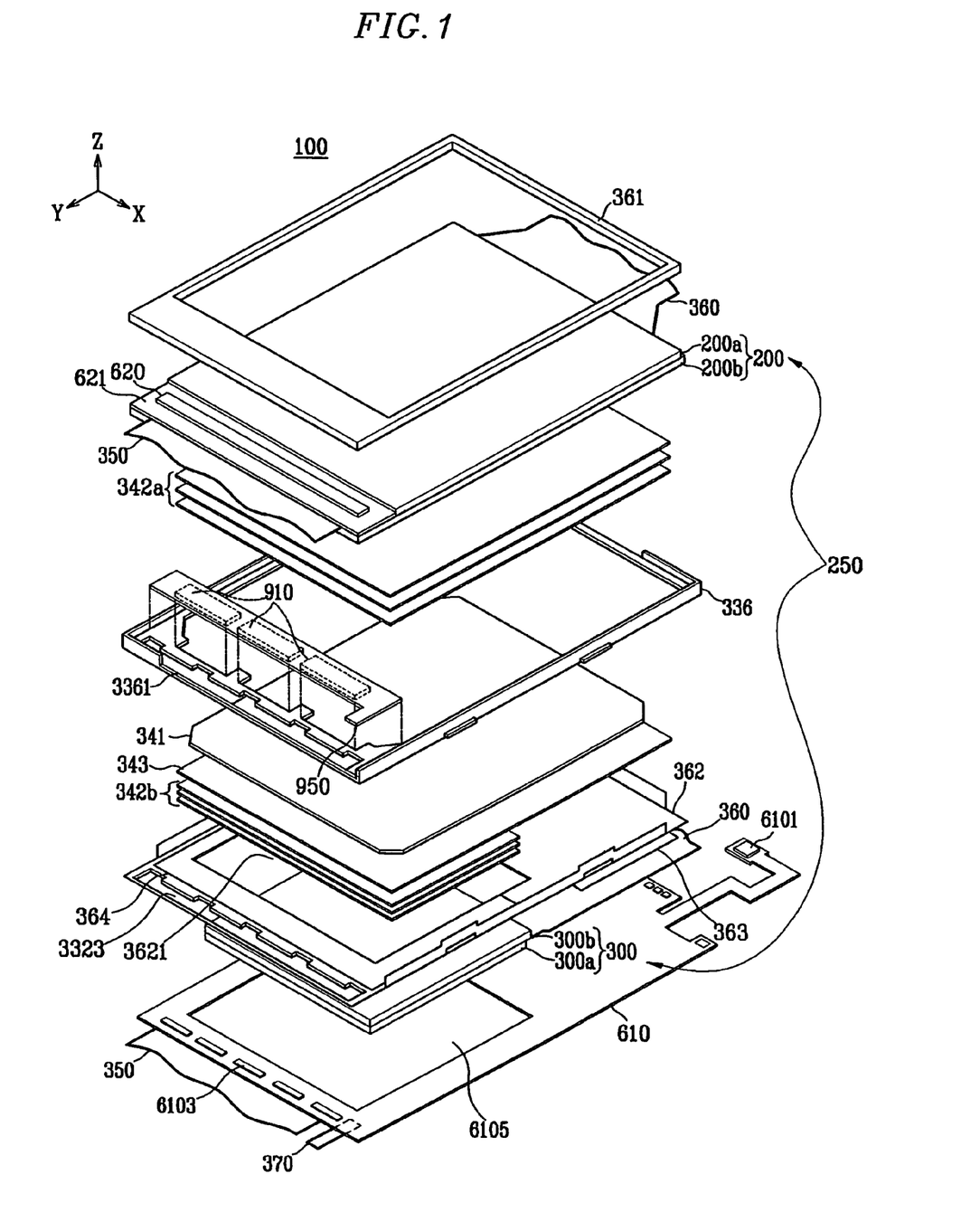
FIG. 1 is an exploded perspective view of a display device according to a first embodiment of the present invention.

FIG. 1 is an exploded perspective view of a display device 100 having a main panel unit 200 and a sub panel unit 300. FIG. 1 shows a dual display device 100 in which the main panel unit 200 and the sub panel unit 300 are opposite to each other, but this is intended only to exemplify a structure and an arrangement of a display device according to the present invention, and thus the present invention is not limited to the presently described embodiments. Therefore, the display device 100 can be modified in other embodiments.

The display device 100 shown in FIG. 1 includes a panel unit assembly 250 and a light source 910. A plurality of fixing members 361, 336, and 362 are provided to fix and support these elements. The fixing members 361, 336, and 362 may be made from at least one among a metal and a resin material. The fixing members 361 and 362 may be made with a metal used as a chassis and the fixing member 336 may be made with a resin. Hereinafter, the fixing member 361 is referred to as a "top chassis," the fixing member 336 is referred to as a "mold frame," and the fixing member 362 is referred to as a "bottom chassis." The material of these fixing members is intended only to exemplify the present invention, and thus the present invention is not limited to the presently described materials. Therefore, other materials for forming the top chassis 361, the mold frame 336, and the bottom chassis 362 may be used.

A panel unit assembly 250 includes a main panel unit 200, a sub panel unit 300, a first flexible printed circuit film 350, a second flexible printed circuit film 360, an integrated circuit (IC) chip 620, and a printed circuit board (PCB) 610. FIG. 1 shows two panel units, for example, the main panel unit 200 and the sub panel unit 300. However, this is intended only to exemplify the present invention, and thus the present invention is not limited to the present embodiment. Therefore, the panel unit assembly 250 may include one or three or more panel units. Furthermore, FIG. 1 shows two LCD panels as panel units 200 and 300, but this is intended only to exemplify a type of panel unit that may be used in the present invention, and thus the present invention is not limited to the present embodiment. Therefore, the panel units of the panel unit assembly 250 may include at least one LCD panel and an OLED panel may be used as a panel units.

The main panel unit 200 is larger than the sub panel unit 300 opposite to the main panel unit 200. Specifically, in the display device 100 used in a folder-type cellular phone, the main panel unit 200 is positioned at the inside of a cellular phone folder unit and the sub panel unit 300 is positioned at the outside of the cellular phone folder unit. Therefore, in a state that the folder unit is shut, a relatively small amount of information such as time can be displayed by the sub panel unit 300 having a small screen size. In a state that the folder unit is opened for communication, a relatively large amount of information can be displayed by the main panel unit 200 having a large screen size.

Hereinafter, an inner structure of the main panel unit 200 that is an LCD panel will be described. The structure of the sub panel unit 300 is the same as the structure of the main panel unit 200 and thus a detailed description of the sub panel unit 300 will be omitted.

A thin film transistor (TFT) panel 200b positioned in a lower portion of the main panel unit 200 is a transparent glass panel consisting of thin film transistors having a matrix shape, and a data line is connected to its source terminal and a gate line is connected to its gate terminal. A pixel electrode consisting of transparent indium tin oxide (ITO), which is a conductive material, is formed in the drain terminal.

If an electrical signal from the PCB 610 is input to the data line and the gate line of the main panel unit 200, the electrical signal is input to the source terminal and the gate terminal of the TFT. The TFT is turned on or off by the input of the electrical signal and the electrical signal required for forming a pixel is output to the drain terminal.

On the other hand, a color filter panel 200a of the main panel unit 200 is arranged on, and opposite to, the TFT panel 200b of the main panel unit 200. A RGB pixel is a color pixel which reveals a predetermined color when light passes through it. The color filter panel 200a is composed of RGB pixels by a thin film process and its front surface is coated with common electrodes consisting of ITO. When power is applied to the gate terminal and the source terminal of the TFT, and thus the thin film transistor is turned on, an electric field is formed between the pixel electrodes and the common electrodes of the color filter panel 200a. The array angle of liquid crystals injected between the TFT panel 200b and the color filter panel 200a is changed by the electric field and light transmittance is changed by the changed array angle, whereby, the desired image is obtained. A polarizer (not shown) is attached to both outside surfaces of the TFT panel 200b and the color filter panel 200a.

Similarly, a color filter panel 300a of the sub panel unit 300 may be arranged on, and opposite to, a TFT panel 300b of the sub panel unit 300.

The IC chip 620 applies a driving signal and a timing signal to the gate line and the data line of the TFT to control the array angle of liquid crystals in the main panel unit 200 and to arrange timing of the liquid crystal. The IC chip 620 is attached on the TFT panel 200b and enclosed by a protective film 621. The IC chip 620 generates a gate driving signal, a data driving signal for driving the main panel unit 200, and a plurality of timing signals for applying these signals in proper time. The IC chip 620 applies the respective gate driving signal and the data driving signal to the gate line and the data line of the main panel unit 200.

The second flexible printed circuit film 360 connects the main panel unit 200 and the sub panel unit 300 to each other, enclosing one side surface of the bottom chassis 362. FIG. 1 shows the second flexible circuit film 360 in a cut-out state for convenience, but in actual implementation, the second flexible circuit film 360 is actually in a connected state. Because the main panel unit 200 and the sub panel unit 300 are connected to each other, a driving signal of the integrated circuit chip 620 is transmitted to the sub panel unit 300 through the main panel unit 200. Therefore, the IC chip 620 also controls the sub panel unit 300.

A plurality of elements 6103 are mounted to the PCB 610 for transmitting a signal to the first flexible printed circuit film 350 and a cellular phone connector 6101 is mounted to the end of the PCB 610. The first flexible printed circuit film 350 receives a signal of an opening degree of a folder window for a cellular phone through the cellular phone connector 6101. The first flexible printed circuit film 350 connects the main panel unit 200 and the PCB 610 to each other. FIG. 1 shows the first flexible circuit film 350 in a cut-out state for convenience, but in actual implementation, the first flexible circuit film 350 is actually in a connected state.

Elements 6103 mounted to the PCB 610 include resistance elements. The respective element-receiving openings 3361 and 3323 are formed in the bottom portion of the mold frame 336 and the bottom chassis 362 and receive the elements 6103 in the inside when combining all inside parts of the display device 100 as shown in FIG. 1. Therefore, it is possible to minimize a size (e.g., an overall thickness or width in a Z direction) of the display device 100 while utilizing inside space of the display device 100 to the maximum. Further, only the element-receiving opening 3323 may be formed, in the floor portion of the bottom chassis 362, to receive the elements 6103.

A light source 910 for supplying light to both panel units 200 and 300 is provided between the main panel unit 200 and the sub panel unit 300. FIG. 1 shows a light emitting diode (LED) as the light source 910, but this is intended only to exemplify the present invention, and thus the present invention is not limited to using LED as the light source. In other embodiments, other light sources may be used.

A light guiding plate 341, a reflection sheet 343, and pluralities of optic sheets 342a, 342b may be further included in order to supply light emitted from the light source 910 to the respective panel units 200, 300 with increased brightness.

The light guiding plate 341 guides light emitted from the light source 910. The reflecting sheet 343 reflects and transmits light. Specifically, a part of the light emitted from the light source 910 may be transmitted towards the bottom chassis 362 (e.g., a lower portion of the display device 100) and thus supplies light to the sub panel unit 300.

A circuit board 950 is connected to a third flexible printed circuit film 370, receives a signal for controlling a light source from the PCB 610, and drives the light source 910.

The circuit board 950 for mounting the light source 910 is received into and fixed to the mold frame 336. Further, the main panel unit 200 is received into the mold frame 336. The sub panel unit 300 is fixed to the opening 3621 formed in the bottom chassis 362. The lower portion of the bottom chassis 362 is covered with the PCB 610 provided with the opening 6105 so that the sub panel unit 300 is exposed to the outside. Non-conductive member 363 is inserted between the bottom chassis 362 and the second flexible printed circuit film 360 to prevent them from coming in contact with each other and creating a short-circuit. The tape 364 attached around the opening 3621 of the bottom chassis 362 prevents external foreign substances from entering into the display device 100 through the opening 3621.

Figure 2:
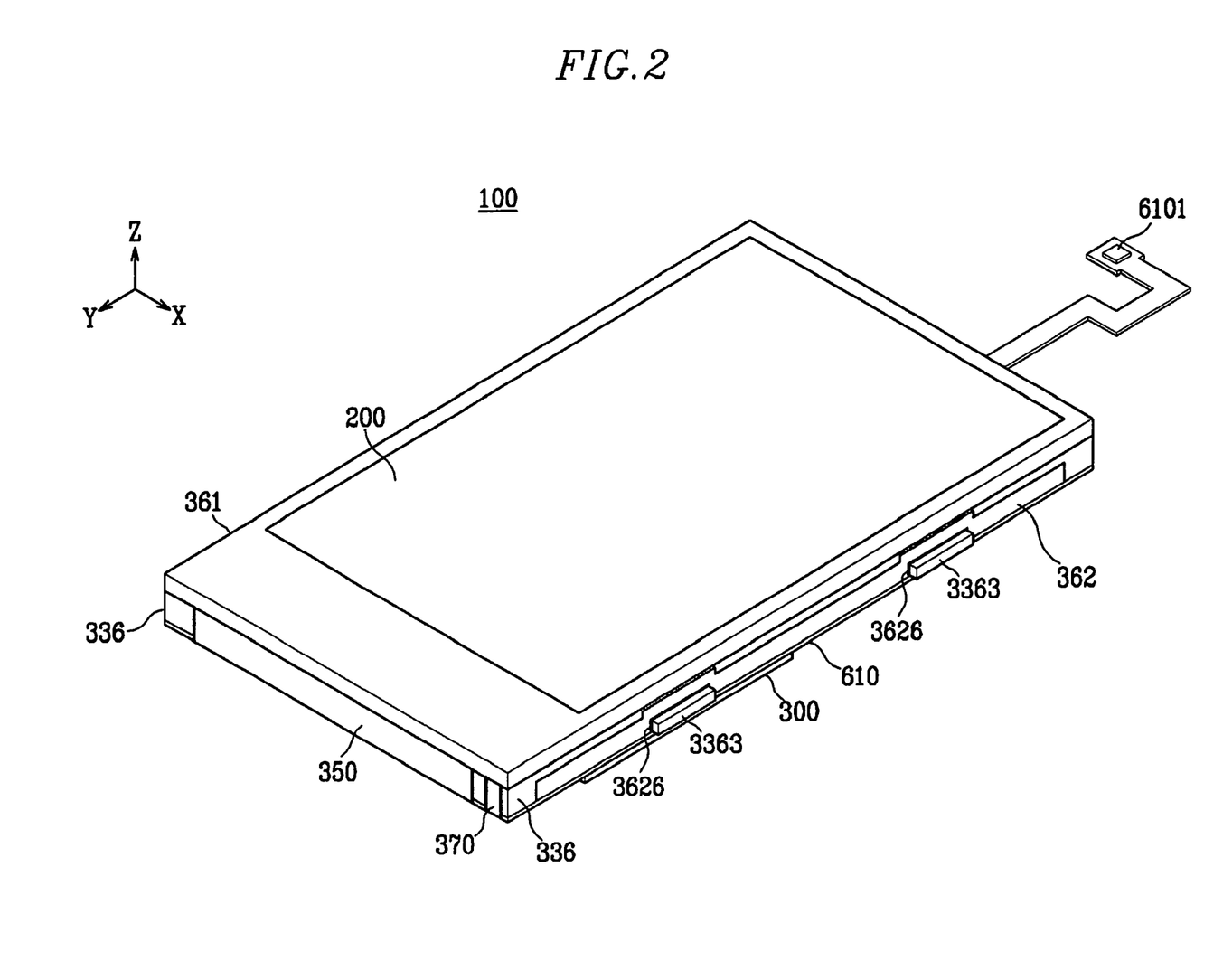
FIG. 2 is a perspective view of the display device according to the first embodiment of the present invention.

FIG. 2 shows all the inside parts of the display device 100 combined.

As shown in FIG. 2, coupling portions 3363 protruded from the side surfaces of the mold frame 336 is inserted into and fixed to coupling openings 3626 of the bottom chassis 362. An upper portion of the mold frame 336 is covered with top chassis 361. The mold frame 336 is enclosed by and fixed to the top chassis 361 and the bottom chassis 362. Therefore, the display device 100 can be protected from external impact. A display device 100, sufficiently endurable to external impact by changing a structure of the bottom chassis 362, is provided in the present invention.

Hereinafter, the structure of the bottom chassis 362 will be described in detail with reference to FIGS. 3A, 3B, 4A and 4B. In the description, the term 'length' means a distance from one end to the other end formed along the Y axis direction and the term 'width' means a distance from one end to the other end formed along the Z axis direction.

Figure 3A:
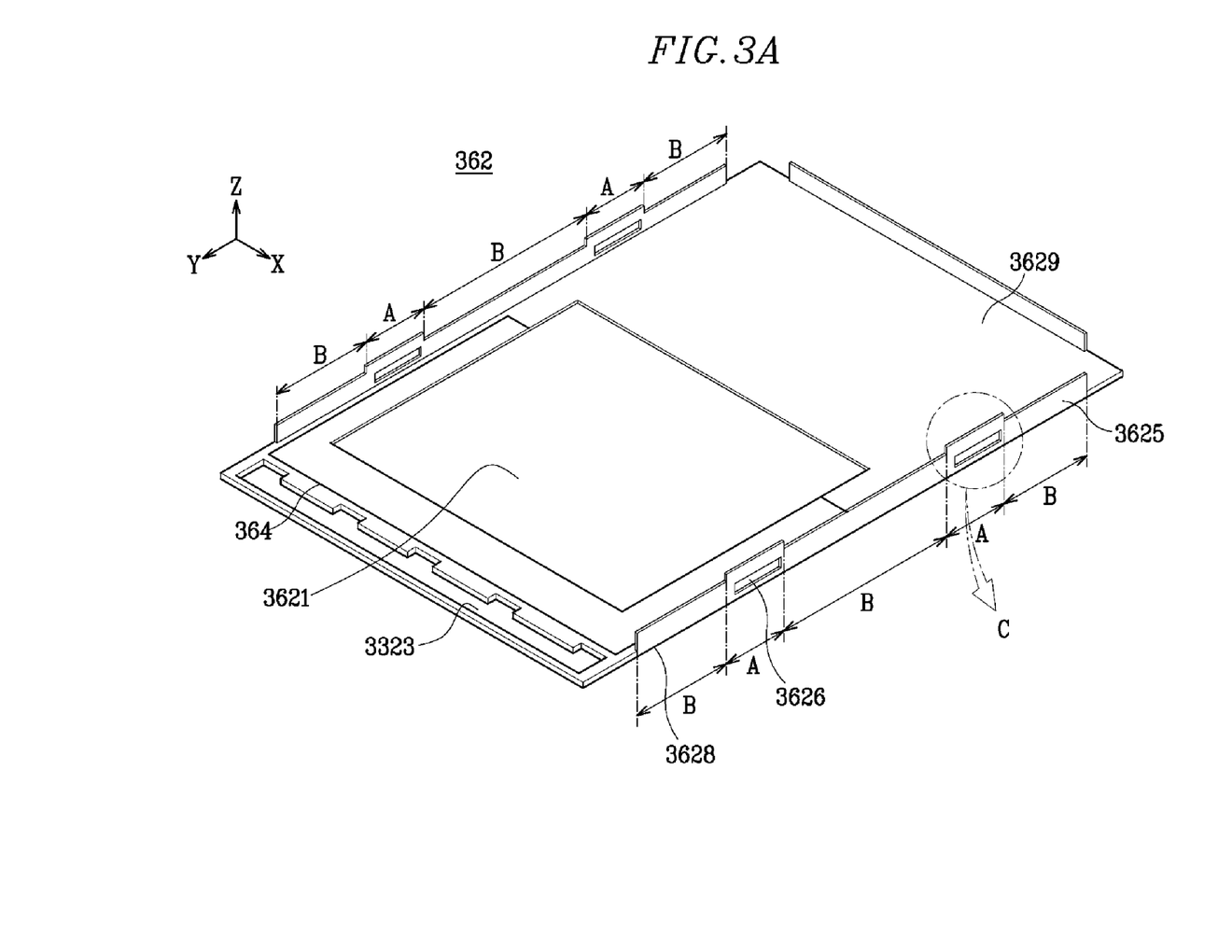
FIGS. 3A and 3B are perspective and enlarged views, respectively, of a fixing member provided in the display device according to the first embodiment of the present invention.
Figure 3B:
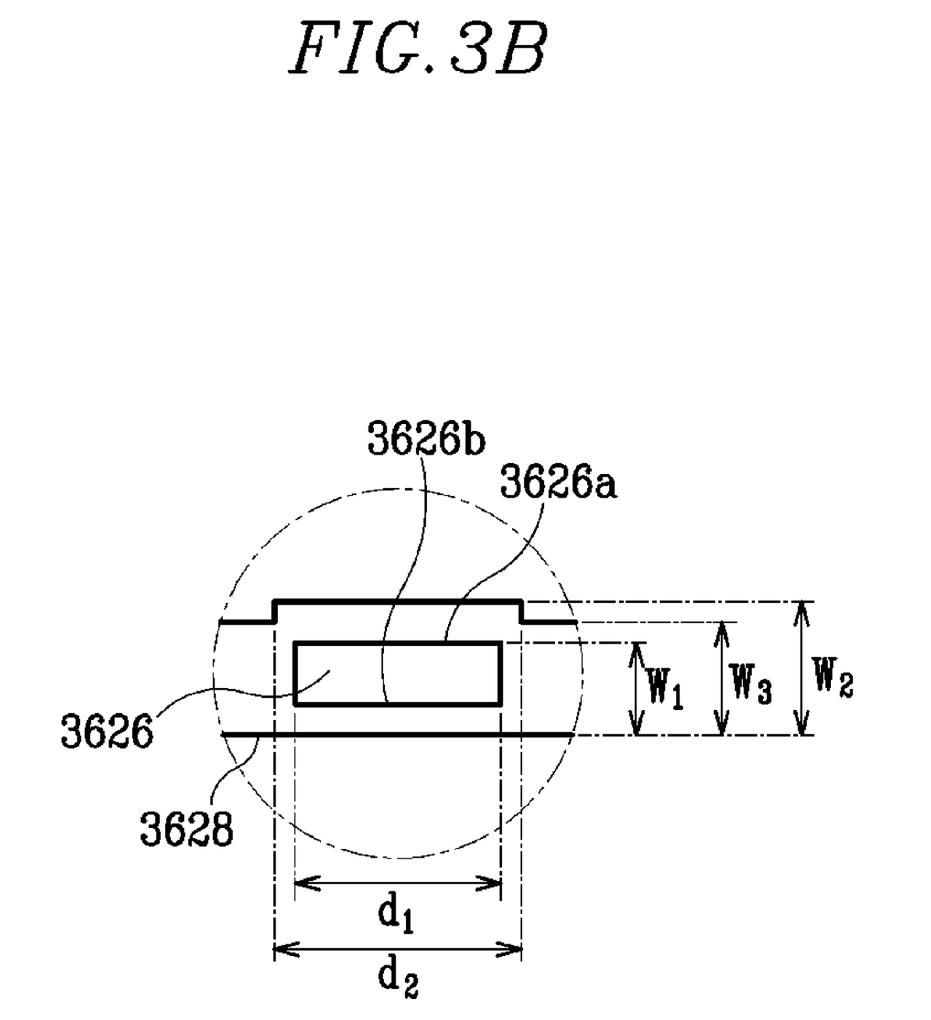

FIGS. 3A and 3B shows an enlarged bottom chassis 362 separated from the display device 100. A structure of the bottom chassis 362 shown in FIGS. 3A and 3B is intended only to exemplify the present invention and thus the present invention is not limited to the present embodiment. In other embodiments, the bottom chassis 362 may be changed to various other structures.

As shown in FIGS. 3A and 3B, the bottom chassis 362 includes a bottom portion 3629 and a side portion 3625. The bottom chassis 362 may include other portions as needed. The bottom portion 3629 and the side portion 3625 form a bottom-portion boundary 3628 together. That is, the side portion 3625 extends from the bottom-portion boundary 3628 toward the combining direction of the panel unit (Z axis direction).

The side portion 3625 of the bottom chassis 362 includes at least two coupling areas A, and support areas B connected to the coupling areas A. The coupling areas A are areas coupled to the mold frame 336 (shown in FIGS. 1 and 2) and the support areas B are areas adjacent to, and supported by, the side surface of the mold frame 336. Since at least two coupling areas A are formed in the bottom chassis 362, they can be firmly coupled to the mold frame and so on. Further, because the bottom chassis 362 is supported by the support areas B, the coupling state can be more firmly maintained.

In the first embodiment of the present invention, the coupling areas A are formed at both sides in the length direction of the side portion 3625, thereby making the bottom chassis balanced. Since the coupling areas A are symmetrically formed, it is possible to improve the strength of the display device 100.

The support areas B are formed at the center and ends in the length direction of the side portion 3625. When the display device 100 is dropped, the bottom chassis 362 is bent from the center. That is, the largest stress is applied to the center of the bottom chassis 362. Therefore, the support areas B are formed at the center of the bottom chassis 362 so as to prevent damage to the central portion due to stress. Even if an external impact is applied to the display device 100, the display device 100 is not deformed thanks to the support areas B.

FIG. 3B illustrates portion C of coupling areas A As shown in FIG. 3B, a coupling opening 3626 is formed in the coupling area A. That is, the length $d_1$ of the coupling opening 3626 is smaller than the length $d_2$ of the coupling area A. Because the coupling opening 3626 is frail to external impact, it is formed in the coupling area A. Accordingly, it is possible to protect the display device 100 from the external impact.

Further, the width $W_1$ from one end 3626a of the coupling opening 3626 to the bottom-portion boundary 3628 close to the other end 3626b of the coupling opening 3626 is smaller than the width $W_3$ of the support area B. Here, the end 3626a of the coupling opening 3626 is the edge extending in the length direction (Y axis direction) of the side portion 3625, but not the edge extending in the width direction (Z axis direction) of the side portion 3625.

Specifically, when the display device 100 is dropped, the largest stress is applied to the coupling areas A because of the coupling opening 3626. Therefore, the largest stress is applied to a portion of the coupling areas A from the end 3626a of the coupling opening 3626 to the bottom-portion boundary 3628 close to the other end 3626b of the coupling opening 3626. Therefore, by setting the width $W_1$ smaller than the width $W_3$ of the support areas B, a part of the stress can be distributed to the support areas B. Thus, by uniformly distributing the stress into the whole side portion 3625, it is possible to improve the strength of the display device 100.

On the other hand, the side portion 3625 is formed so that the width $W_2$ of the coupling areas A is larger than the width $W_3$ of the support areas B. Therefore, when an external impact is applied to the coupling areas A, it is possible to minimize the stress applied to the coupling areas A by providing enough space to form the coupling opening 3626 in the coupling areas A. It is preferable that the coupling opening 3626 is disposed apart from the bottom-portion boundary 3628. When the coupling opening 3626 is disposed too close to the bottom-portion boundary 3628, foreign substances may enter the coupling opening 3626. Therefore, a malfunction of the display device 100 may be caused. In this case, it is not desirable from the view point of strength because the coupling opening 3626 is too large.

As described above, in the first embodiment of the present invention, it is possible to greatly improve the strength of the display device 100 by simply deforming the side portion 3625 of the bottom chassis 362.

Hereinafter, a structure of a bottom chassis provided in the display device 100 according to a second embodiment of the present invention will be described with reference to FIG. 4.

Figure 4A:
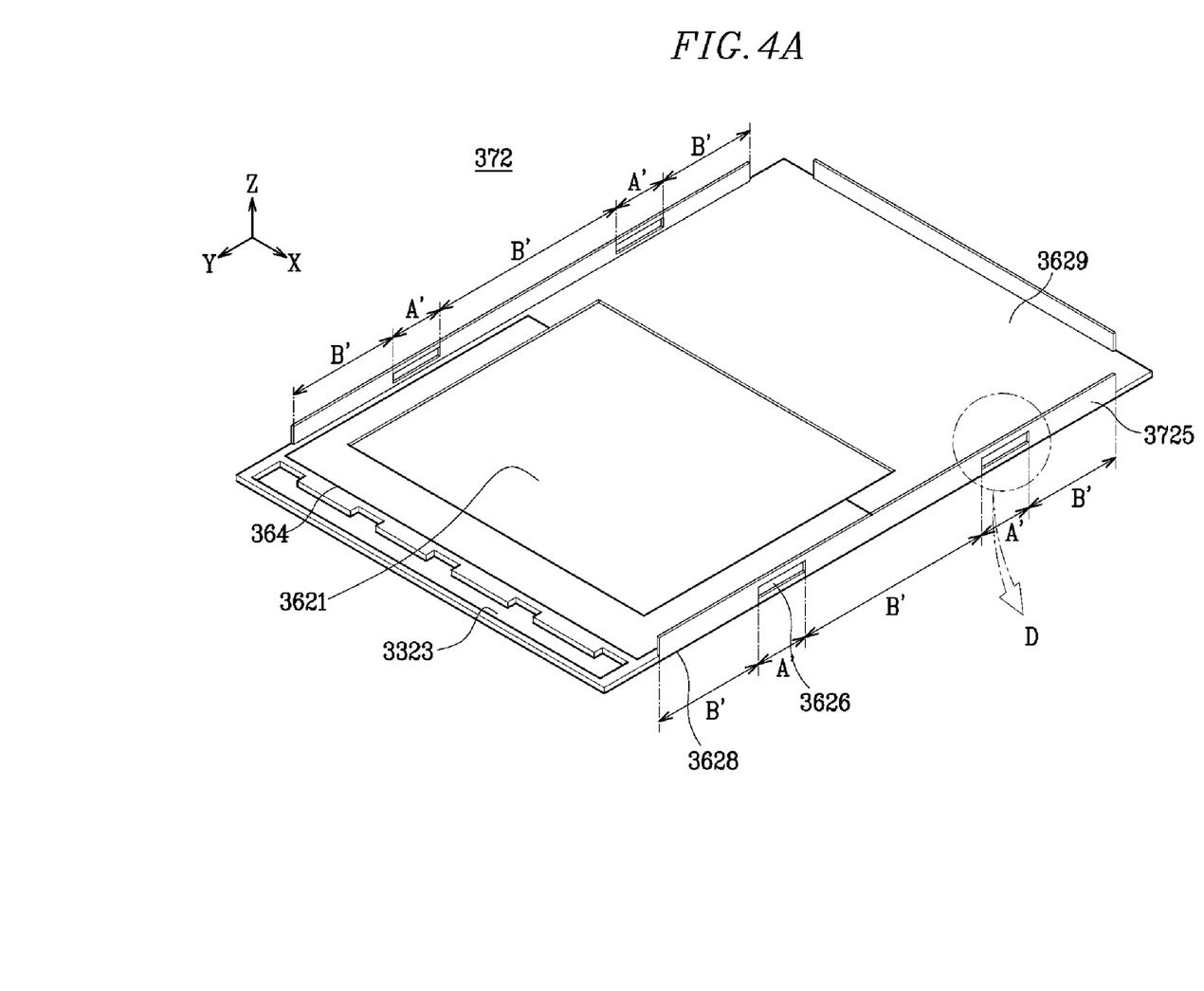
FIGS. 4A and 4B are perspective and enlarged views, respectively, of a fixing member provided in a display device according to a second embodiment of the present invention.
Figure 4B:
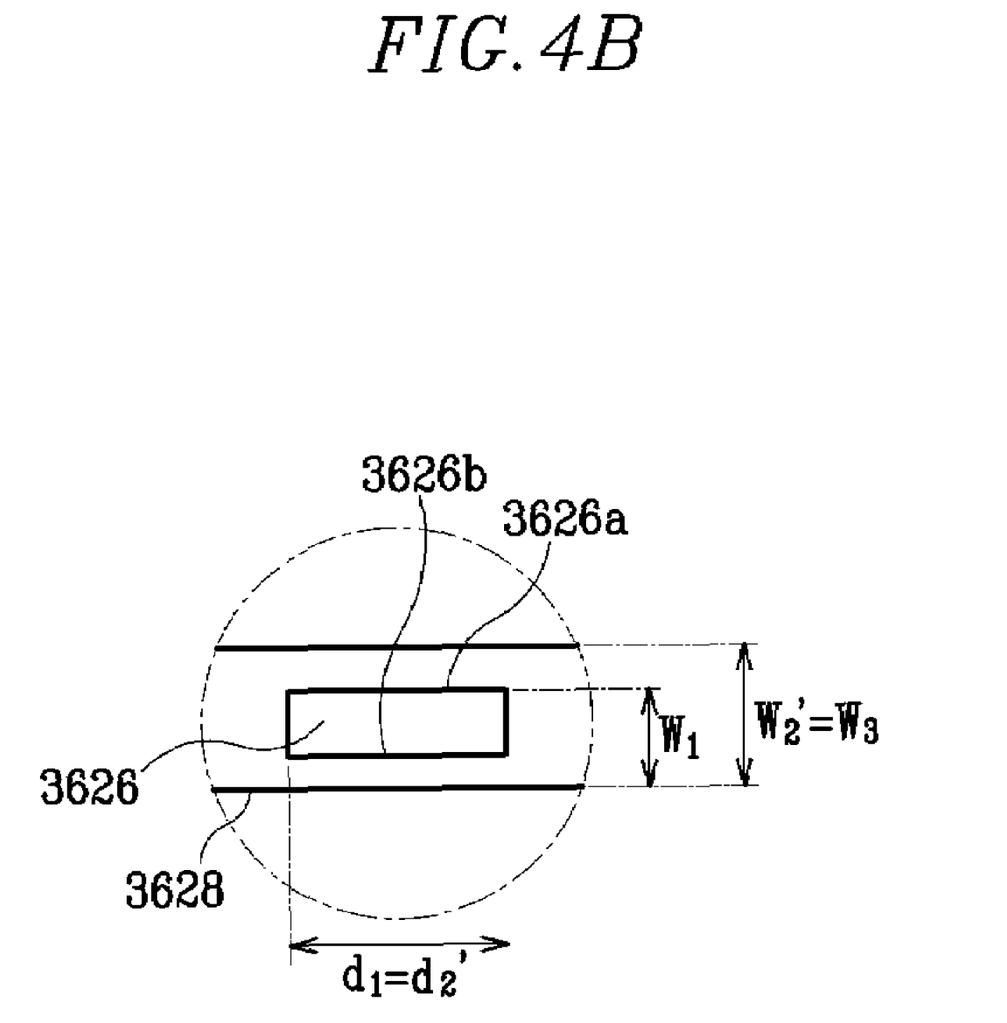

FIGS. 4A and 4B show a modified example of the side portion of the bottom chassis according to the first embodiment of the present invention shown in FIGS. 3A and 3B. The bottom chassis 372 shown in FIGS. 4A and 4B is similar to the bottom chassis 362 according to the first embodiment of the present invention, except for the side portion 3725, and thus the detailed description will be omitted. Further, the same elements as those of the first embodiment of the present invention are denoted by the same reference numerals.

The side portion 3725 includes coupling areas A' and support areas B'. The width $W_2'$ of each of the coupling areas A' is equal to the width $W_3$ of a respective support area B'. Referring to FIG. 4B, the coupling opening 3626 is positioned in the coupling area A', and the length $d_1$ of the coupling opening 3626 is equal to the length $d_2'$ of the coupling area A'. By forming the side portion 3725, the support areas B' can be formed successive to the coupling areas A' without an additional machining process, thereby simplifying the machining process. Further, it is possible to improve the strength of the display device 100 by improving the strength of the bottom chassis 372.

Hereinafter, the present invention will be described in detail with reference to an experimental example of the present invention. The experimental example of the present invention is intended only to exemplify the present invention and thus the present invention is not limited to the presently described experimental example.

Comparative Example

A dropping simulation experiment was executed using a dual LCD device of Model LTS180S3-HF as a sample. The structure of the dual LCD device is equal to that of the display device according to the first embodiment of the present invention.

In the drop simulation experiment, stress applied to each portion of the sample was simulated and displayed in colors. By observing the colors, the stress distribution was obtained. The stress distribution shows that the stress becomes stronger as it goes from blue color to red color. The specific simulation condition can be easily understood by those skilled in the art and thus the detailed description thereof is omitted.

Experimental Example

A drop simulation experiment was executed using a conventional dual LCD device as a sample. In the sample, the width $W_2$ of the coupling areas is greater than the width $W_3$ of the support areas B" in the side portion 3625 of the bottom chassis. Only a part of the support areas B", not the majority, is formed at the center of the side portion. Since the other experiment conditions are equal to those of the experimental example of the present invention, the detailed descriptions will be omitted.

Figure 5A:
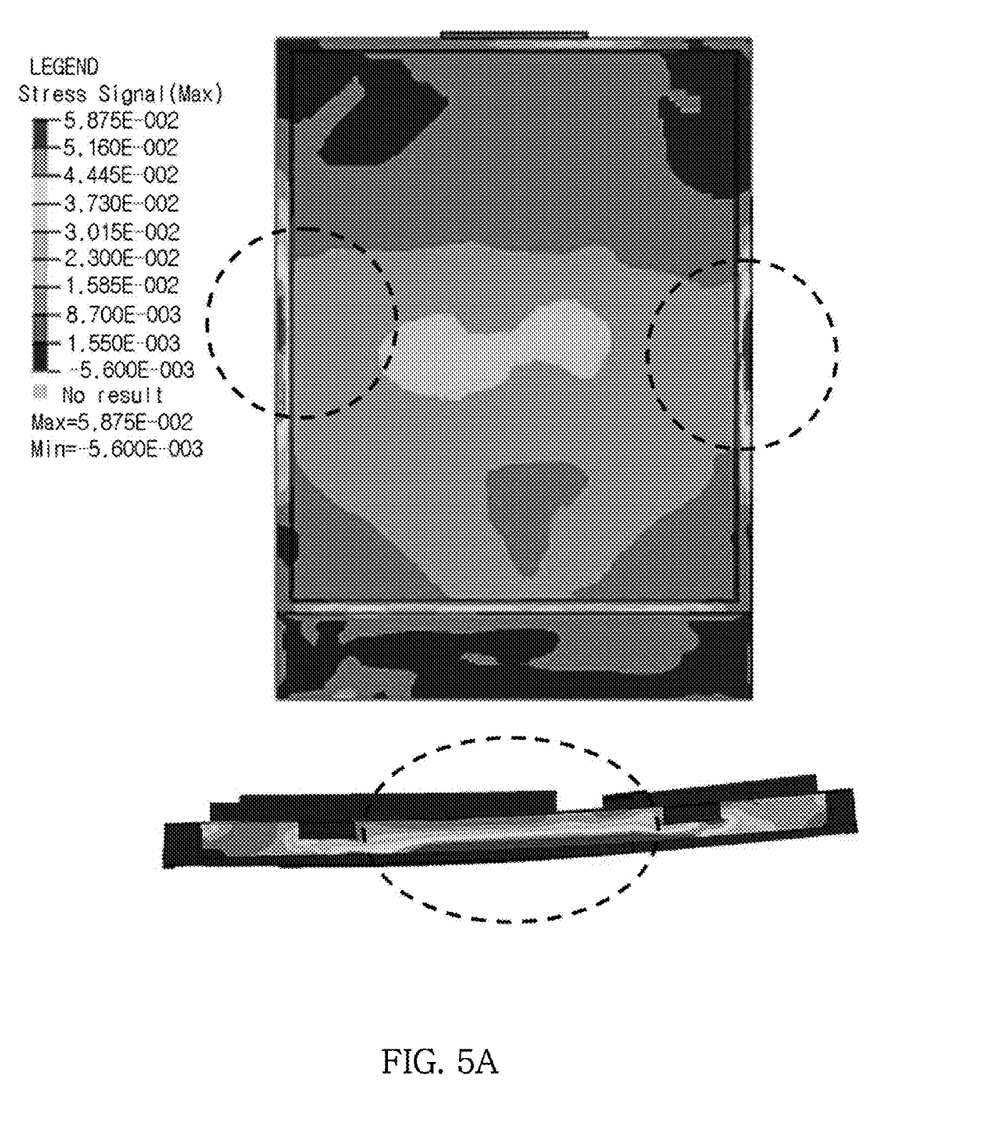
FIGS. 5A and 5B are diagrams illustrating results according to an experimental example of the present invention and a comparative example of a conventional technique, respectively.
Figure 5B:
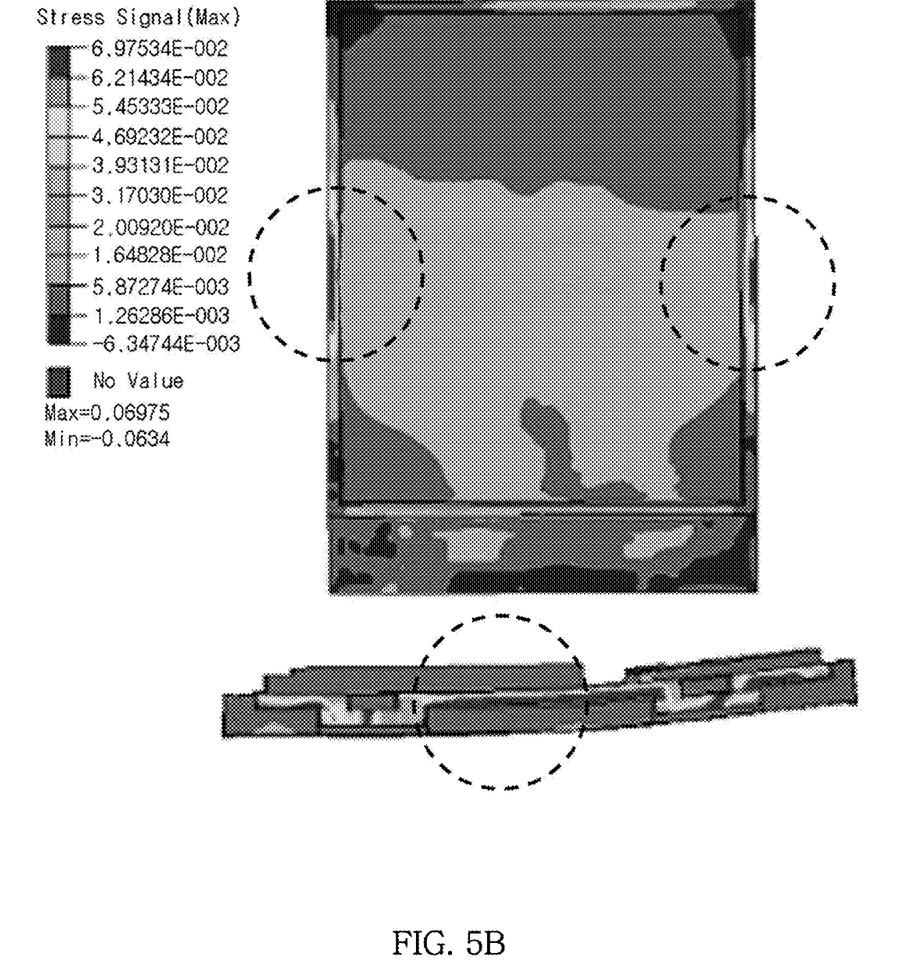

Stress distributions according to the experimental example and the comparative example are shown in colors in FIGS. 5A and 5B. FIGS. 5A and 5B are diagrams illustrating results according to an experimental example of the present invention (FIG. 5A) and a comparative example of a conventional technique (FIG. 5B).

Referring to the upper picture of FIG. 5A, in a display panel in accordance with the present invention, the largest stress was applied to the center of the side portion shown in a red color (enclosed in dotted circles) in the experimental example and the stress was about 58.7 MPa. Referring to the lower picture of FIG. 5A, the area of the stress distribution shown in a blue color (enclosed in a dotted circle) at the center of the side portion was relatively small.

On the contrary, referring to the upper picture of FIG. 5B, in a conventional display panel, the largest stress was applied to the center of the side portion shown in a red color (enclosed in dotted circles) in the comparative example and the stress was about 69.7 MPa. Further, referring to the lower picture of FIG. 5B, the area of the stress distribution shown in a blue color (enclosed in a dotted circle) at the center of the side portion was relatively great.

Therefore, the largest stress acting on the sample of the experimental example was about 84.2% of the largest stress acting on the sample of the comparative example. This result shows that it is possible to improve the strength of the display device by simply deforming the side portion of the bottom chassis.

Although the exemplary embodiments of the present invention have been described, it can be obviously understood by those skilled in the art that the present invention may be modified in various forms without departing from the spirit and scope of the appended claims.

What is claimed is:

1. A display device comprising:
a panel unit displaying an image; and
a first fixing member receiving the panel unit and including a bottom portion and a side portion extending from a boundary of the bottom portion toward a combining direction of the panel unit,
wherein the side portion of the first fixing member includes at least two coupling areas, a support area extending from the coupling areas along a length direction of the side portion, and an enclosed coupling opening penetrating the side portion of the first fixing member in the coupling areas, the side portion of the first fixing member solely defining the enclosed coupling opening,
wherein a distance taken in the combining direction from one end of the enclosed coupling opening furthest from the boundary of the bottom portion to the boundary of the bottom portion is smaller than a width of the support area taken in the combining direction, and wherein a width of a coupling area taken in the combining direction is greater than the width of the support area.

2. The display device of claim 1, wherein the support area is formed at a center of the side portion in the length direction of the side portion.

3. The display device of claim 1, wherein the coupling areas are formed in the length direction of the side portion.

4. The display device of claim 1, wherein the enclosed coupling opening is disposed apart from the boundary of the bottom portion.

5. The display device of claim 1, wherein a length of the enclosed coupling opening is smaller than or equal to a length of the coupling area.

6. The display device of claim 1, wherein the display device further comprises a second fixing member surrounding the panel unit,
wherein a coupling portion protruded from the side surface of the second fixing member is inserted into and fixed to the enclosed coupling opening of the first fixing member.

7. The display device of claim 6, wherein the second fixing member is made of a resin.

8. The display device of claim 1, wherein an element-receiving opening is formed in the bottom portion of the first fixing member.

9. The display device of claim 1, further comprising a plurality of panel units, wherein at least one of the panel units is a liquid crystal display panel.

10. The display device of claim 1, wherein the display device is used for a cellular phone.

11. The display device of claim 1, wherein the first fixing member is made of a metal.

12. A display device comprising:
a panel unit displaying images; and
a fixing member receiving the panel unit and including a bottom portion and a side portion extending from an edge of the bottom portion and in a combining direction of the display device;
wherein the side portion of the fixing member includes:
a plurality of combining portions;
a plurality of supporting portions disposed alternately with the combining portions along a longitudinal direction of the fixing member; and
an enclosed coupling opening extended through the side portion of the fixing member in each of the plurality of the combining portions, the side portion of the fixing member solely defining the enclosed coupling opening, an upper edge of the enclosed coupling opening being disposed apart from an upper edge of the support portions in the combining direction, and a lower edge of the enclosed coupling opening being disposed apart from the edge of the bottom portion in the combining direction,
wherein a height of each of the combining portions is greater than a height of each of the supporting portions, the heights taken in the combining direction, and
wherein a distance taken in the combining direction from the upper edge of the enclosed coupling opening to the edge of the bottom portion, is smaller than the height of each of the supporting portions.

* * * * *